A. THOMPSON.
DRAINING DEVICE.
APPLICATION FILED DEC. 19, 1906.
936,188.
Patented Oct. 5, 1909.
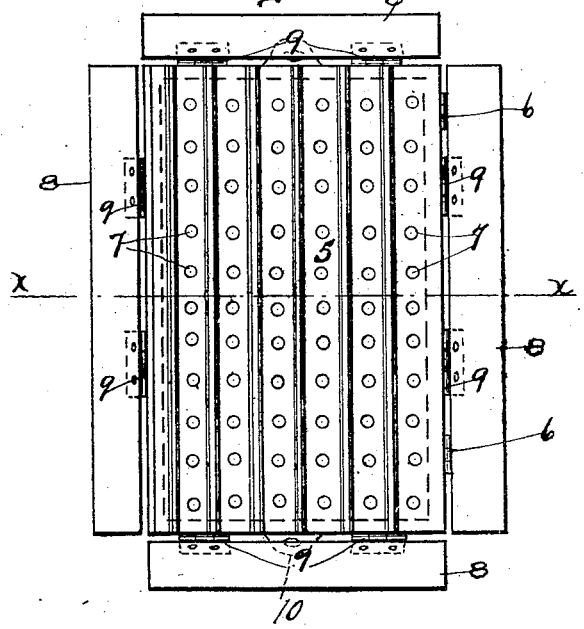
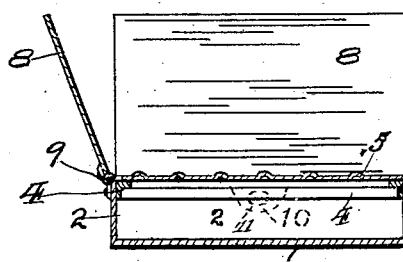
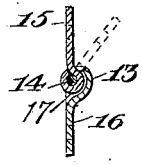
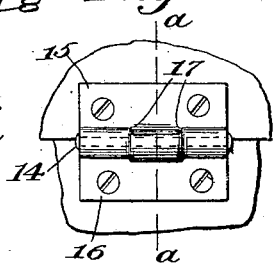
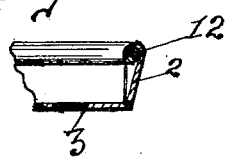
WITNESSES:
A. Nelson.
E. C. Brainard
INVENTOR
Anna Thompson,
BY
Harry Lea Dodson,
ATTORNEY

UNITED STATES PATENT OFFICE.

ANNA THOMPSON, OF LA GRANGE, ILLINOIS.

DRAINING DEVICE.

936,188.

Specification of Letters Patent. Patented Oct. 5, 1909.

Application filed December 19, 1906. Serial No. 348,594.

*To all whom it may concern:*

Be it known that I, ANNA THOMPSON, a citizen of the United States, residing at La Grange, in the county of Cook and State of Illinois, have invented certain new and useful Improvements in Draining Devices, of which the following is a specification.

My invention relates to that class of devices which are used in the kitchen for draining dishes after they have been washed.

My invention has for its object to construct a drainer which can be set on the drain-board of the sink or in any other convenient place and which will care for the drip at all times, and also to construct a drainer which can be folded up after the dishes have been drained and it is desired to hang it away so as to take up very little room.

My means of accomplishing the foregoing may be more readily understood by having reference to the accompanying drawings, which are hereunto annexed and are a part of this specification, in which, Figure 1 is a top or plan view with the sides and ends raised. Fig. 2 is a cross section taken on the line $x$—$x$ in Fig. 1. Fig. 3 is a detail view of the modified form of construction for the supporting piece. Fig. 4 is a detailed view of the hinge showing the stop. Fig. 5 the cross section taken in the line A A in Fig. 4.

In the drawings, 1 is the draining device proper which is a pan or other receptacle having side and end walls 2 and a bottom 3.

4 is the supporting piece which extends around the top of the side and end walls 2 and which may be secured thereto by solder or any other convenient method of fastening.

A corrugated plate 5 is attached to the top of one of the side walls 2 by hinges 6 and rests upon the supporting piece 4. This corrugated plate is provided with a large number of perforations 7 which may be of any size desired. Lapped sections 8, all of the same width, are fastened to the top of the side and end walls 2 by means of hinges 9 which are provided with stops. As more clearly shown in Figs. 4 and 5, the hinge is provided with a pin 14, and is constructed in two pieces 15 and 16, the central portion of the member 16 is slotted as at 17, and the severed portion is raised forming a stop 13, so that when the member 15 is moved outwardly it assumes the position shown in the dotted line in Fig. 5, and being brought in contact with the stop 13 is held from further movement. A handle 10 having an opening 11 therein may be formed on the draining receptacle proper so that it can be hung up when desired. This handle may be secured to the receptacle by solder or any other convenient method of fastening.

When the dishes are washed and ready to drain, they are placed on the corrugated plate, where it is obvious the water from the dishes will drip down into the receptacle or pan to which it is hinged. The corrugations prevent the slipping of the dishes when placed or piled up on the plate. The lapped sections are raised so as to stand upright, the stops preventing them from falling backward, thus holding the dishes within the drainer and providing space for a greater number of dishes.

After the dishes have been drained and it is desired to hang the drainer away, it may be folded into a compact bundle by folding the lapped sections on top of each other.

In the construction shown in Fig. 3, the pan 1 is constructed with a wire 12 which extends around the side and end walls 2 on the inner side, the said walls being folded over the said wire thus making a construction which is similar to the construction of ordinary pans with the exception that the wire forming the binding for the edge of the end and side walls 2 is placed on the inner side of the said walls. This form of construction will permit the use of the regular machinery in factories constructing pans, and permits of the manufacture of the pan 1 without incurring any additional expense for machinery or any additional operation in constructing the said pan than is followed in the ordinary construction of pans of similar shape where the wire is placed on the outside. It is obvious that any such change as this, being a mere detail of construction, would be within the scope of my invention.

Having described my invention, what I regard as new, and desire to secure by Letters Patent, is:—

In a device of the character described, the combination with a receptacle or pan, of a corrugated plate, retaining means to prevent the corrugated plate telescoping to the bottom of the pan or receptacle, lapped sections hinged to the top of the side walls of
5 the receptacle by means of hinges, stops on said hinges, the lapped sections being adapted to fold on top of the corrugated plate when not in use, one of said lapped sections folding on top of the opposite one.

ANNA THOMPSON.

Witnesses:
   E. C. BRAINARD,
   A. NELSON.